Jan. 28, 1964 M. TOMASOVICH 3,119,271
SAMPLE TAKING DEVICE FOR PORTABLE BULK PRODUCE BINS
Filed June 11, 1962 3 Sheets-Sheet 1

INVENTOR.
Martin Tomasovich
BY
Webster & Webster
ATTYS.

Jan. 28, 1964  M. TOMASOVICH  3,119,271
SAMPLE TAKING DEVICE FOR PORTABLE BULK PRODUCE BINS
Filed June 11, 1962  3 Sheets-Sheet 2

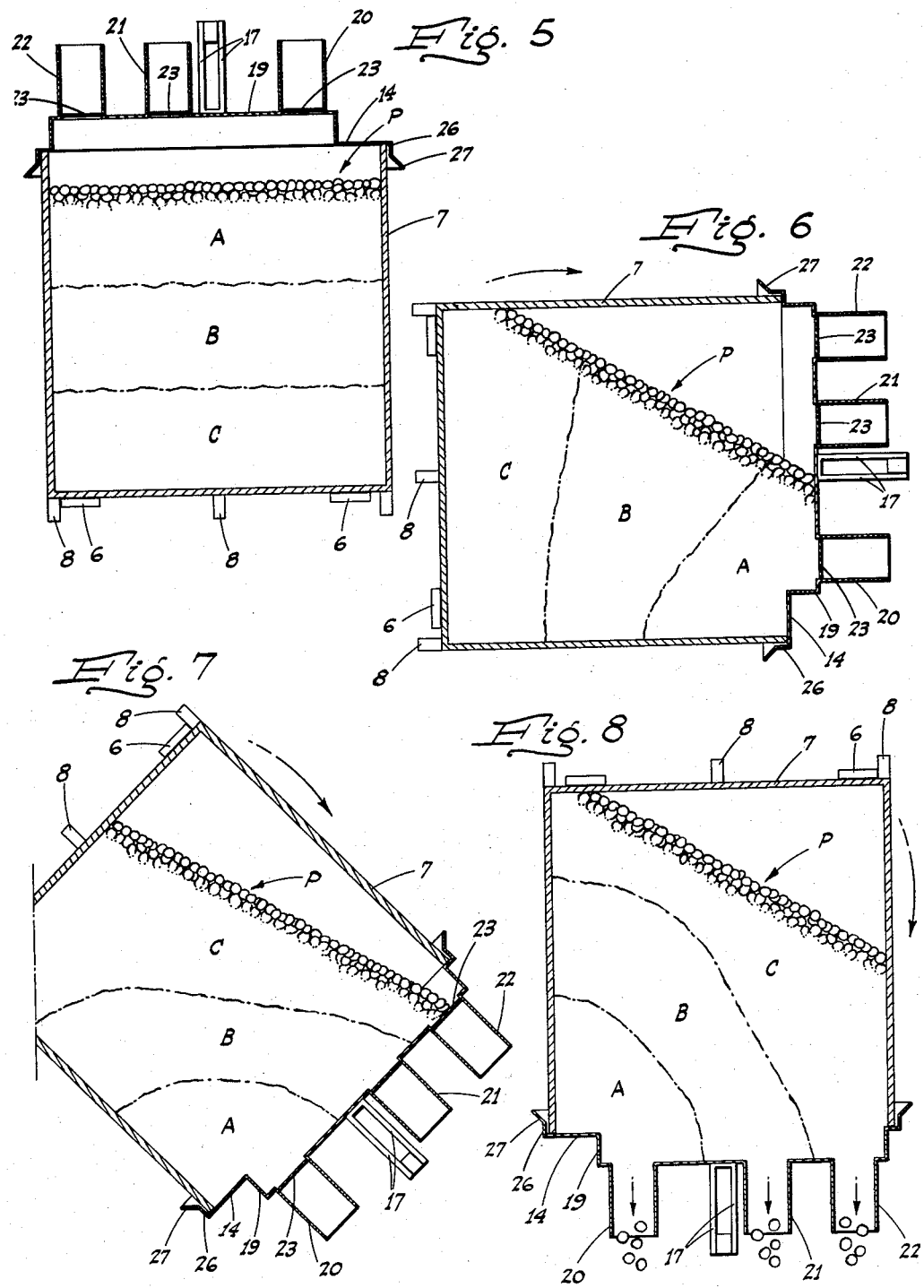

United States Patent Office 3,119,271
Patented Jan. 28, 1964

3,119,271
SAMPLE TAKING DEVICE FOR PORTABLE
BULK PRODUCE BINS
Martin Tomasovich, Rte. 1, Box 26, Live Oak, Calif.
Filed June 11, 1962, Ser. No. 201,650
2 Claims. (Cl. 73—424)

In the agricultural industry it is the practice to transport free-flowing produce, such as nuts and fruit, from the field to a processing plant or other destination in large but portable bulk bins, which are conventionally rectangular, of substantial depth, and open at the top.

Before the free-flowing produce is dumped from the loaded bins at their destination, samples of the produce are taken from each bin in order to establish and record the average grade or quality, and which—for accurate results—requires the obtaining of samples from the upper, intermediate, and lower zones or layers of the load of produce.

Heretofore the withdrawal of the samples from the intermediate and lower zones or layers of the produce in a bin has been difficult to readily accomplish, and existing devices for the purpose have not been wholly satisfactory.

It is therefore the major object of the present invention to provide a novel device which is arranged for taking samples from each of such zones or layers of a bin load in a quick, easy, and efficient manner; the bin being inverted for the sample-taking operation, and said device including a lid which covers—and is held in engagement on—the top of the bin upon inversion of the latter. The device further includes gated spouts which depend from the lid when the bin is inverted, and through which spouts the samples are withdrawn.

Another important object of this invention is to provide a device for the purpose which is constructed, and the gated spouts so oriented, that upon inversion of the bin the produce from each of the aforementioned zones or layers occupies a position, for sample withdrawal, through a corresponding one of said gated spouts.

An additional object of the invention is to provide a device for the purpose which is adapted to be mounted in connection with a fork-lift truck having a rotary mount employed to invert the loaded produce bin from which the samples are to be taken; the fork-lift truck including mechanism which clampingly engages the lid, as included in the device, on the bin for inversion therewith and preparatory to said sample taking operation.

It is also an object of the invention to provide a practical and reliable sample taking device for portable bulk produce bins, and one which will be exceedingly effective for the purpose for which it is designed.

These objects are accomplished by means of such structure and relative arrangement of parts as will fully appear by a perusal of the following specification and claims.

In the drawings:

FIG. 5 is a transverse sectional elevation, on reduced scale, showing the device engaged with the top of a fork-supported bin in upright position; the view illustrating—diagrammatically—the several zones or layers of the produce comprising the bin load.

Figure 1:
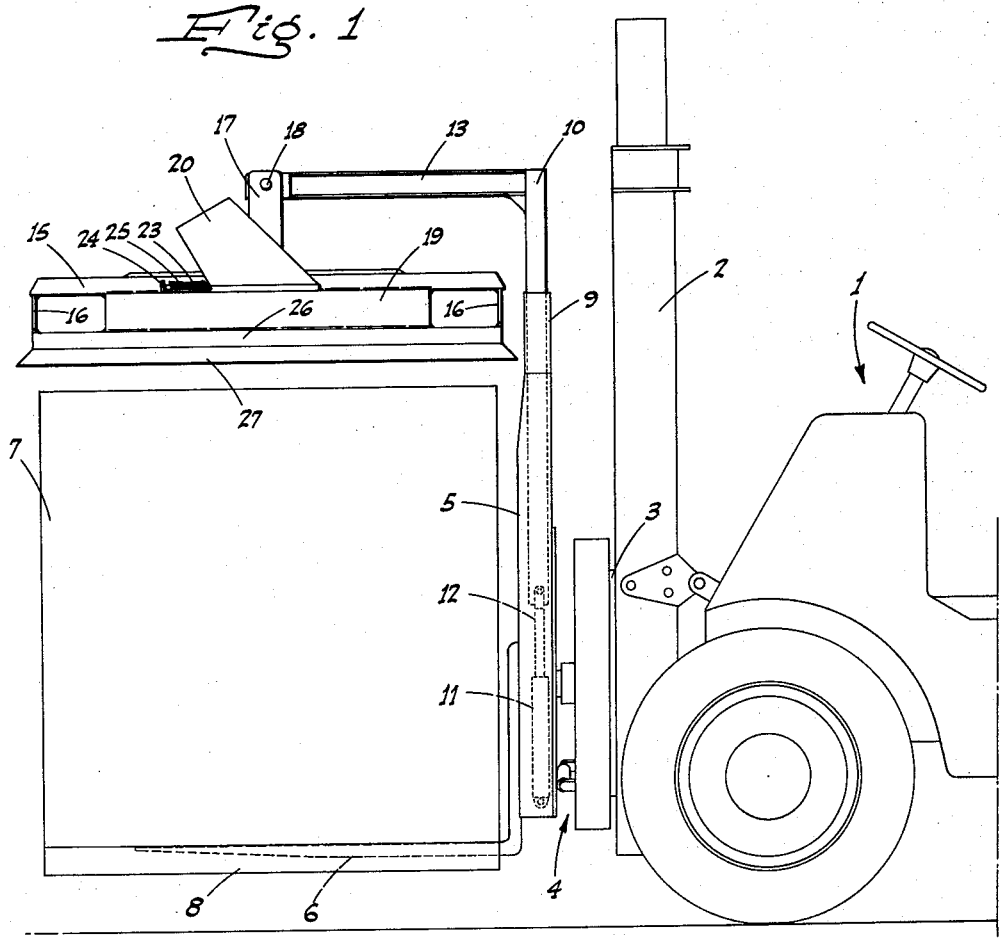
FIG. 1 is a side elevation showing the device as mounted on a fork-lift truck, and in a position spaced above the top of a fork-supported produce bin.
Figure 4:
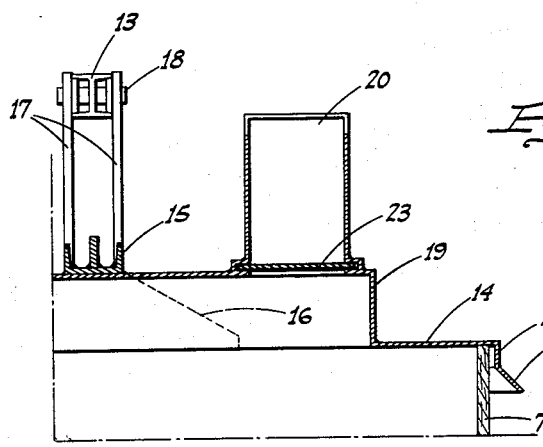
FIG. 4 is a fragmentary transverse sectional elevation on line 4—4 of FIG. 3.
Figure 2:
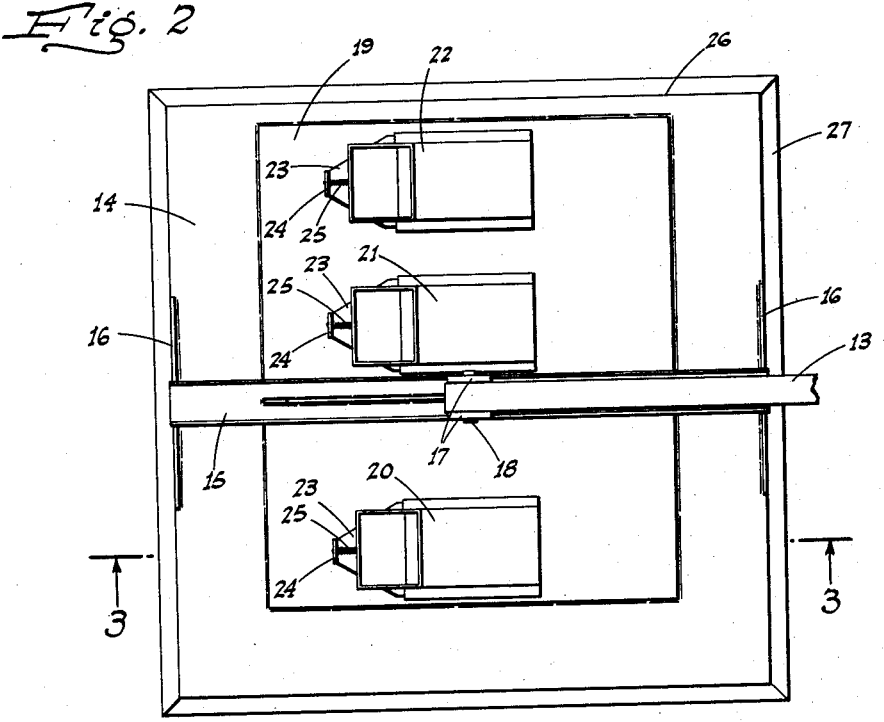
FIG. 2 is a top plan view of the device.
Figure 3:
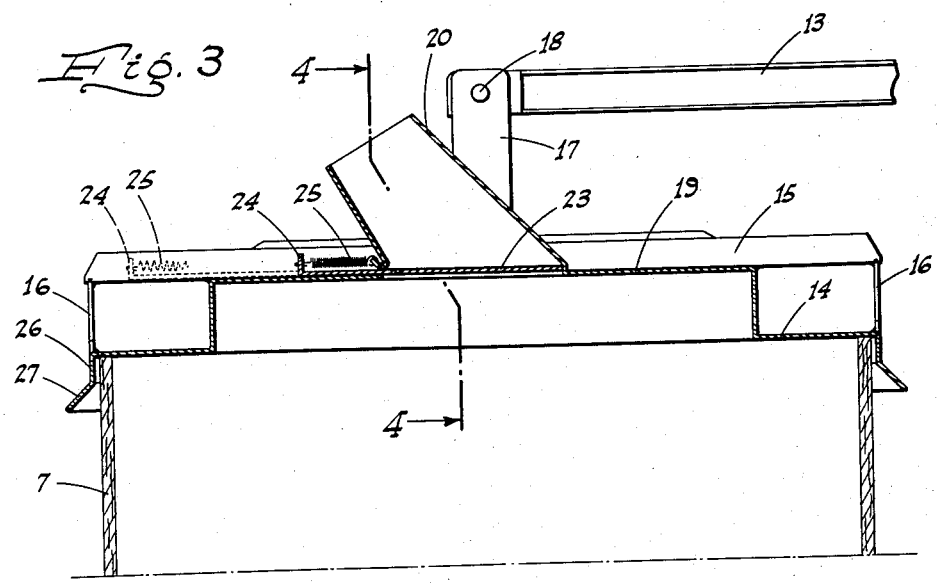
FIG. 3 is an enlarged longitudinal sectional elevation on line 3—3 of FIG. 2; the view showing the device as engaged on the top of a bin.

FIGS. 6, 7, and 8 are similar views, and show the progressive flow pattern of the several zones or layers of the produce as the bin is rotated between its upright position and its inverted position.

Referring now more particularly to the drawings, and to the characters of reference marked thereon, and at present to FIGS. 1-4 inclusive, the numeral 1 indicates a fork-lift truck which conventionally includes, at the front, an upstanding elevator frame 2 having a power actuated elevator carriage 3 thereon.

The elevator carriage 3 is fitted with a rotary mount 4; such mount being of any suitable type, but preferably that shown in my United States Patent No. 2,979,217, dated April 11, 1961.

The rotary mount 4 includes a normally upstanding rotatable frame 5 which—through means included in said mount—is adapted to be rotated through no less than 180 degrees clockwise from the perpendicular position of said frame 5.

At the lower portion thereof the normally upstanding rotatable frame 5 is fitted with a pair of transversely spaced, forwardly projecting forks 6 adapted for engagement beneath an open-top, portable bin 7 containing a load of free-flowing produce, such as nuts or fruit. The forks 6 engage the bottom of the bin 7 laterally inwardly of the usual bottom cleats 8.

The normally upstanding rotatable frame 5, which is vertically elongated, is provided at its upper end with a guide 9 through which a reciprocable standard 10 slidably extends intermediate its ends. A double acting power cylinder 11 is mounted within the confines of the lower portion of frame 5, and such power cylinder includes an upwardly extending piston rod 12 connected to the lower end of the standard 10, whereby to selectively and forcefully raise or lower such standard.

At its upper end the standard 10 is fitted with a rigid, forwardly projecting arm 13 which terminates at its front or outer end substantially centrally above the bin 7 when supported on the forks 6.

A rectangular bin cover or lid 14 of a size to fully embrace the top of the fork-supported bin 7 is disposed in spaced relation below the arm 13 and in a position symmetrical to such bin.

A mounting and hold-down bar 15 is disposed in spaced parallel relation above the lid 14 and extends longitudinally from front to rear thereof and centrally of its sides; the ends of the bar 15 being attached to the lid 14 by connector plates 16; the spacing between the lid 14 and bar 15 being for the purpose hereinafter described.

A relatively short upstanding post 17 is fixed centrally on the bar 5, which disposes such post in alinement with the center of the fork-supported bin 7. The post 17 is comprised—as shown—of transversely spaced upstanding members or ears, and the front or outer end of the arm 17 is pivoted between the upper ends of such ears, as at 18.

The lid 14 includes, as an integral part thereof, a rectangular, normally inverted pan 19 which opens through said lid 14, and extends upwardly therefrom to abutment and connection with the bar 15.

The normally inverted pan 19, while being of substantial size in plan, is however somewhat smaller than the lid; the pan being spaced equi-distantly from the front and rear edges of the lid 14, but offset transversely on the lid opposite the clockwise direction in which the bin is turned to its inverted position. See FIG. 2.

Between the front and rear edges thereof the normally inverted pan 19 is fitted with a transverse row of gated chutes, indicated at 20, 21, and 22; such chutes initially or normally extending at a forward and upward incline from the pan 19. The chutes 20 and 22 are located closely adjacent corresponding sides of the pan 19, whereas the chute 21 is offset so that it is disposed closer to chute 22 than to chute 20.

Each of the chutes 20, 21, and 22 includes, at the base thereof, a normally closed slide gate 23 having an exteriorly accessible upturned flange 24 adapted for finger engagement by an operator, and whereby the gate may be manually opened. Each gate 23 is normally but yieldably maintained in closed position by a return spring 25.

The rectangular lid 14, which is of slightly greater dimensions than the bin 7—though symmetrical thereto—includes a depending peripheral flange 26 which merges at its lower edge with an integral outwardly flaring skirt 27.

In operation of the device, and for the purpose of taking samples from the load of produce in the bin 7, the lid 14 initially occupies a raised, out-of-the-way position, as in FIG. 1. Nextly, the fork-lift truck 1 is manipulated until the forks 6 engage beneath the bin. This is followed by operation of the power cylinder 11 in a direction to lower the standard 10, with resulting clamping engagement of the lid 14 on the top of the bin 7; the depending peripheral flange 26 and skirt 27 assuring of proper locating of said lid on the bin.

With the lid 14 remaining clamped against the top of the bin, the elevator carriage 3 is run upwardly a substantial distance, and which must be sufficient to permit the bin to be rotated to an inverted position, with the arm 13 then disposed quite a distance above ground.

Such inversion of the bin, as clamped between the forks 6 and lid 14, is accomplished by mechanism within the rotary mount 4, and which forms no part of the present invention.

Upon the bin 17 being rotated clockwise between its initially upright position and its inverted position the following occurs:

By reference to FIG. 5, and wherein the bin is shown in its upright position, the load of free-flowing produce, indicated generally at P, and here illustrated diagrammatically as nuts, may be assumed to comprise an upper layer A, an intermediate layer B, and a lower layer C. It is from each of such layers that a separate sample is desired. As will be seen from FIG. 5, these layers are disposed in vertically stacked relation when the bin is in its initial upright position. As the bin is rotated to an inverted position, said layers gradually assume a side-by-side relation at the then lower end of the bin, as indicated in FIG. 8.

As the bin is rotated clockwise from its initial upright position to a quarter-turned position as in FIG. 6, thence further turned downwardly as in FIG. 7, and finally turned to a fully inverted position as in FIG. 8, the produce layers A, B, and C follow substantially the progressive flow pattern illustrated in FIGS. 6–8 inclusive. Such progressive flow pattern results—when the bin is fully inverted—in the produce from layer A being in register with chute 20; the produce from layer B being in register with chute 21; and the produce from layer C being in register with chute 22.

To attain the above described registry of the layers of produce with the respective chutes, it has been found that this can be accomplished more accurately with the employment of the produce receiving pan 19 (which is upright or upwardly opening when the bin is inverted); with the pan offset on the lid as described; and with the illustrated disposition and spacing of the chutes on said pan.

Thus, with the bin inverted and the described registry of the respective layers of produce with corresponding chutes, an operator—upon opening of the gates 23 of the then depending chutes (see FIG. 8)—withdraws a small quantity of the produce which comprised the layers A, B, and C when the bin was upright. In this way representative or average sampling of the full load of produce can be accomplished.

After the samples are taken, and with the gates 23 closed, the bin is returned to its upright position and the lid 14 is raised, whereby the fork-lift truck 1 can then deliver the bin to any desired destination.

Upon return of the bin to upright the produce does not always reassume a level surface, and may slope up to the lid. However, by offsetting the pan 19 as described, the upper part of the sloping produce cannot pocket in the adjacent part of the pan, and which would tend to cause spilling from the bin when the lid is raised therefrom.

From the foregoing description it will be readily seen that there has been produced such a device as will substantially fulfill the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A sample taking device for a portable bin having an open top and containing a load of free-flowing produce, said device comprising a support for the bin mounted for rotation about a horizontal axis, a lid mounted in connection with the support to removably close the top of the bin and to then clamp the bin on the support so that the bin, the support, and the lid may be rotated as a unit to the inverted position of the bin, means to rotate the support, bin, and lid about said axis in one direction to an inverted position of the bin, the lid including a normally inverted pan opening therethrough, the pan being rectangular and of substantial size in plan, and a plurality of gated outlets on the pan in spaced relation and mounted in a line which lies in a plane disposed at substantially a right angle to the axis of rotation of the supported bin; the pan being offset on the lid in a direction contra to said inverting rotation of the bin; there being three of said gated outlets on the pan, one outlet being adjacent the edge of the pan which leads upon such rotation, a second outlet being adjacent the opposite edge of the pan, and the third outlet being closer to said second outlet than to said one outlet.

2. A sample taking device for a portable bin having an open top and containing a load of free-flowing produce, said device comprising a support for the bin, means mounting the support for rotation about a horizontal axis, a lid mounted in connection with the support to removably close the top of the bin, and to then clamp the bin on the support so that, the support, and the lid may be rotated as a unit to the inverted position of the bin, means to so invert the bin, and a plurality of individually gated outlets mounted on and projecting from the lid in a line which lies in a plane disposed at substantially a right angle to the axis of rotation of the bin.

References Cited in the file of this patent

UNITED STATES PATENTS

| | | |
|---|---|---|
| 2,335,572 | Schroeder | Nov. 30, 1943 |
| 2,589,342 | Christensen | Mar. 18, 1952 |
| 2,673,009 | Hawkins | Mar. 23, 1954 |
| 2,751,089 | Reiter | June 19, 1956 |
| 2,875,912 | Thresher et al. | Mar. 3, 1959 |
| 3,024,929 | Shimmon | Mar. 13, 1962 |
| 3,030,811 | O'Brien | Apr. 24, 1962 |